July 11, 1961 G. J. BRYAN ET AL 2,991,705
APPARATUS FOR APPLYING REFERENCE GRID LINES
TO UNEXPOSED PHOTOGRAPHIC FILM
Filed Jan. 6, 1960 2 Sheets-Sheet 1

INVENTORS
G. J. BRYAN
E. E. KILMER

BY

ATTORNEYS

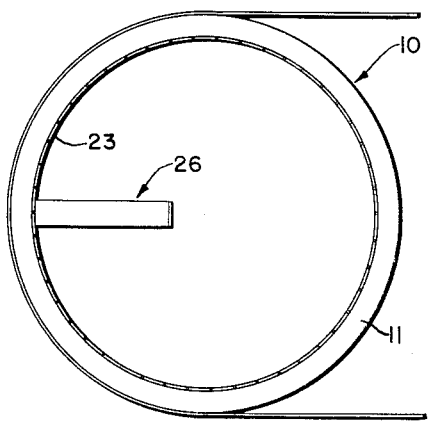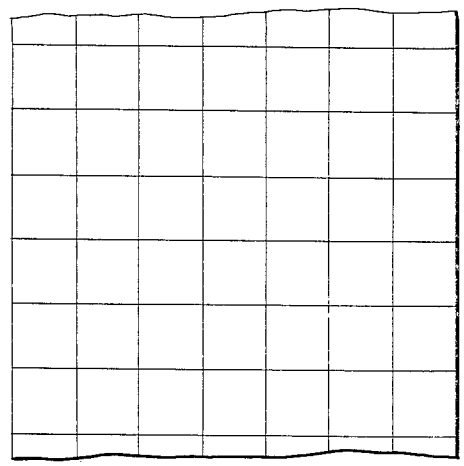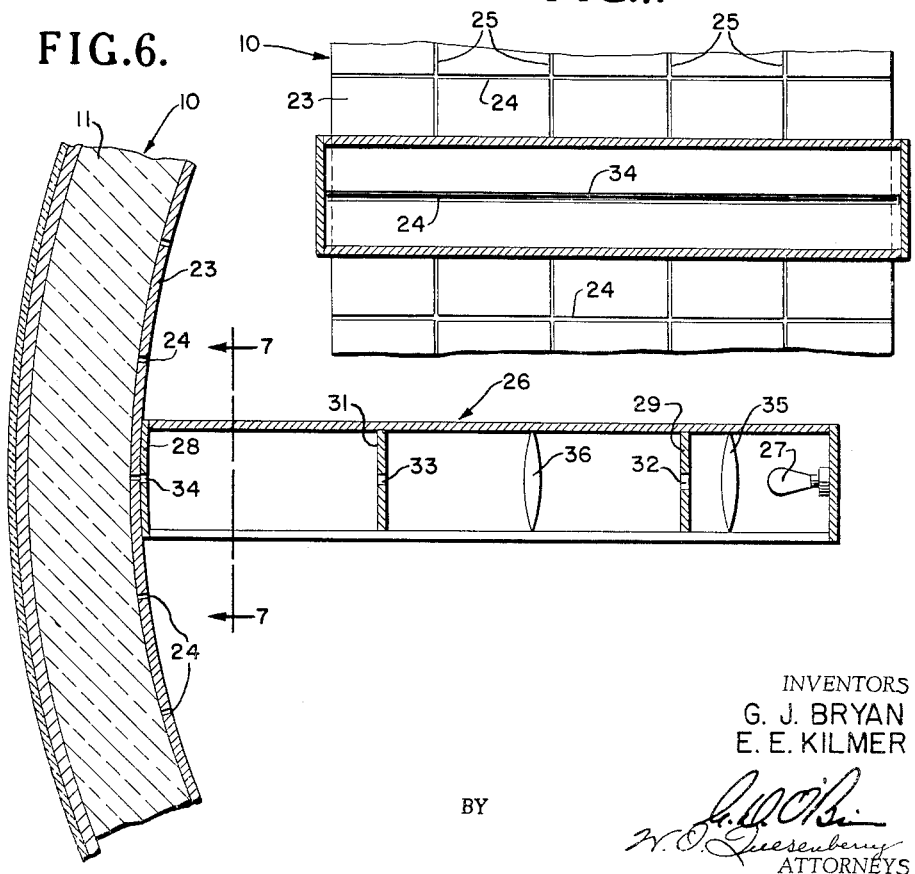

United States Patent Office 2,991,705
Patented July 11, 1961

2,991,705
APPARATUS FOR APPLYING REFERENCE GRID LINES TO UNEXPOSED PHOTOGRAPHIC FILM
George J. Bryan, Cocoa Beach, Fla., and Earl E. Kilmer, College Park, Md., assignors to United States of America as represented by the Secretary of the Navy
Filed Jan. 6, 1960, Ser. No. 1,839
9 Claims. (Cl. 95—77.5)
(Granted under Title 35, U.S. Code (1952), sec. 266)

The invention described herein may be manfactured and used by or for the Government of the United States of America for governmental purposes without the payment of any royalties thereon or therefor.

This application is a continuation-in-part of Serial No. 602,085, filed August 3, 1956, entitled "Method for Applying Reference Grid Lines to Unexposed Photographic Film," now abandoned.

The present invention relates to prescreened photosensitive material for use in photography and more particularly to a new and improved apparatus for applying a sharply defined reference grid pattern to unexposed photographic film during manufacture or before placing the film in a camera whereupon a reference grid will appear thereon when the film is developed after use. Moreover, the invention provides apparatus for applying a reference grid pattern to an unexposed photographic film as the film is moved over an internally lighted rotatable drum, the drum being constructed in such a manner as to allow thin beams of light to impinge on the film through a plurality of transparent breaks or slits formed in a pair of opaque coatings arranged on the inner and outer peripheral surfaces of the drum respectively. Furthermore, during the application of the grid pattern to the film, the movement of the film and rotation of the drum coincide such that the drum and film move as a single unit; in other words, the rate of speed of rotation of the drum is coincidental with respect to the rate of speed of the rotational movement of the film.

An object of the present invention is to provide a new and improved prescreened photographic material and apparatus for making the same.

Another object of the invention is to provide a new and improved apparatus for applying a sharply defined reference grid pattern to a photographic film as the film is moved over a rotating drum.

Still another object of the invention is to provide a prescreened film susceptible to manufacture by continuous methods and which provides a grid pattern of narrow sharply defined lines that appear when the film is developed.

Other objects and many of the attendent advantages of this invention will be readily appreciated as the same becomes better understood by reference to the following detailed description when considered in connection with the accompanying drawings wherein:

FIG. 1 schematically illustrates the preferred apparatus for applying a grid pattern to a photographic film;

FIG. 4 is a plan view of the film illustrating a reference grid pattern applied thereto;

FIG. 5 is a view similar to FIG. 1 illustrating an alternative arrangement of the device of FIG. 1;

FIG. 6 is a fragmentary sectional view of the device of FIG. 4; and

FIG. 7 is a view taken along the line 7—7 of FIG. 6.

Figure 1:
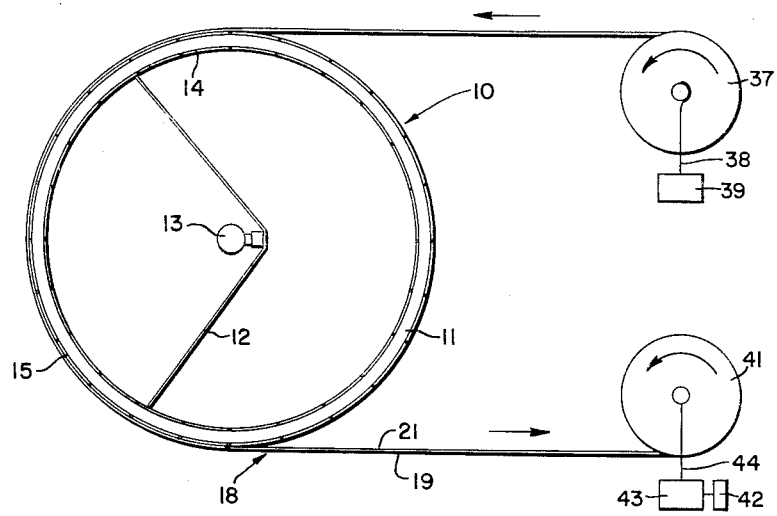
Figure 2:
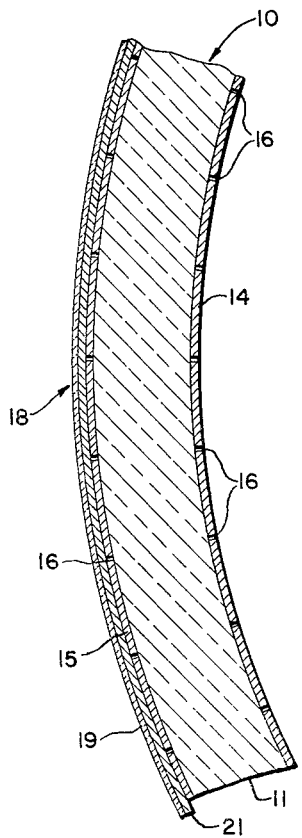
FIG. 2 is an enlarged fragmentary sectional view of the device of FIG. 1.
Figure 3:
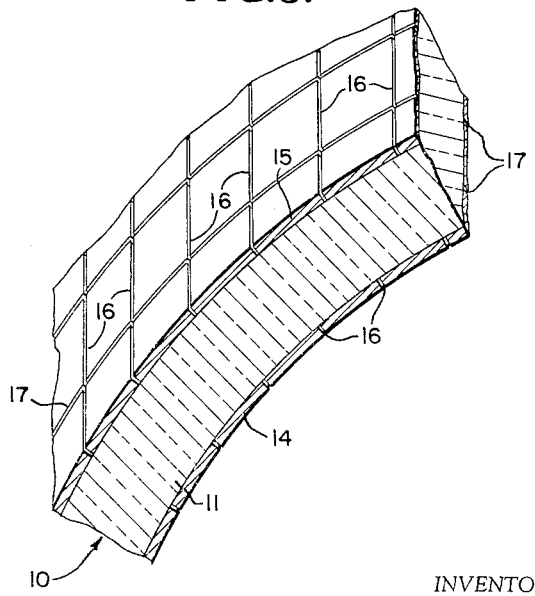
FIG. 3 is a fragmentary view in perspective of the drum of FIG. 1.

Referring now to the drawings for a more complete understanding of the apparatus for applying a reference grid pattern to a photographic film and more particularly to FIG. 1, 10 generally designates a rotatable drum having a cylindrical wall 11 composed of any suitable transparent material and adapted to be rotated continuously in any conventional manner. An example of the apparatus to effect continuous rotation is illustrated in FIG. 1. Motor 42 turns take-up reel 41 by way of shaft 44 and gear box 43 in the direction indicated by the arrow. The axle of take-off reel 37 has a restraining force applied to it by some suitable means as arm 38 which is anchored to block 39. Durm 10 is carried by a shaft and bearing so that it can freely rotate. In this manner, film 18 continuously moves with drum 10 without any slippage or intermittent motion occurring. Of course, it is to be understood any other suitable means may be used to drive the film with the drum. A fixed shield or reflector 12 is disposed within the drum and carries a light 13, FIG. 1, in such a manner that the beams of light are directed outwardly and impinge only on that portion of the wall 11 disposed within the unshielded portion of the drum. As more clearly shown on FIG. 2, an opaque coating 14 is disposed on the inner peripheral surface of wall 11 and a similar coating 15 is disposed on the outer peripheral surface of wall 11, each of the coatings being provided with a grid pattern consisting of a plurality of transversely and circumferentially disposed slits or breaks 16—17, the transverse slits having a length substantially the same as the width of the film 18.

The film comprises a sensitive silver halide emulsion layer 19 carried on a transparent support or base 21. One side of the base engages the outer peripheral surface of wall 11 and the emulsion layer 19 of film 18 is disposed against the other side of the base, the film being movable with the outer peripheral surface of wall 11. It will be understood that the film moves with the drum at the same rate of peripheral motion at which the drum rotates. It is understood that base 21 is incorporated as part of the film. When this occurs thin beams of light pass through the slits 16—17 disposed within the unshielded portion of the drum and impinges on the unexposed film thereby pre-exposing the film and applying a definite reference grid pattern on the emulsion layer 19 consisting of narrow sharply defined mutually spaced lines extending transversely and longitudinally over the surface of the film, FIG. 4, in accordance with the grid pattern on the drum, a sharply defined reference grid becoming visible during development of the film.

It will be noted, FIG. 1, that the shield permits beams of light to pass through slits 16—17 on the drum and impinge on the moving film only as the slits move into the unshielded area of the drum in response to rotation of the drum. The reference grid produced in the aforesaid manner consists of narrow sharply defined lines, the lines being placed no more closely than their use as a reference requires. Moreover, such lines will not affect the appearance and definition of the picture and will form a suitable reference for placement or measurements of objects or recordings after the film is developed. Furthermore, the aforesaid apparatus prevents undesirable gradual or undulant variations of pre-exposure occurring through the film as the grid is applied thereto.

Although a large size shield has been illustrated in the device of FIG. 1, the shield may be made smaller in size, if desired, thereby to reduce the exposed or unshielded area on the drum over which the film is adapted to move, and thus reduction of the exposed area will reduce the amount of exposure at each grid which tends to prevent any smearing of the lines in the event of film slippage. The width of the lines exposed by this method would probably be limited by diffraction rather than by the width of the slits formed in the aforesaid opaque coatings. Moreover, a transparent coating between the film and outer opaque coating which contains the transparent grid may be used to protect the grid surface, but such a transparent coating would increase the width of the lines of the reference grid. Such an arrangement would produce satisfactory results for certain applications.

In the arrangement of FIGS. 5–7 the transparent wall 11 of drum 10 is provided with an opaque coating 23 disposed on the inner peripheral surface thereof and having a plurality of slits 24—25 shown in FIG. 7 arranged thereon. This construction is similar to the slit arrangement of FIG. 1, the width of the slits in this arrangement, however, being normally greater than in the slit arrangement of FIG. 1. The width of these slits in the modification of FIGS. 5–7 is limited by the fact that if the slits become too narrow the light is dispersed and the focusing action is lost. In this embodiment the film is moved with the drum by any conventional means such as shown in FIG. 1.

Disposed within the drum 10 and fixed with respect thereto is a tubular element 26 having a light 27 arranged in one end thereof and a baffle 28 arranged in the other end thereof, the tube 26 being further provided with baffles 29 and 31, baffle 31 being disposed between baffles 29 and 28. As shown on FIG. 6, baffles 29, 31 and 28 are each provided with a centrally disposed transversely arranged rectangular slot 32, 33 and 34, respectively, the width of the slots corresponding to the width of the film and the depth of the slots progressively decreasing in size with respect to the depth of the transversely arranged slits 24 in coating 23. A collimating lens 35 suitable for the purpose is arranged within the tube 26 in mutual spaced relation with respect to light 27 and baffle 29, the lens being adapted to intercept and convert the light rays from the source of light into parallel beams of light which pass through slot 32 in baffle 29. A conventional focusing or bar lens 36 having lenticular cross-sectional configuration is mounted in tube 26 and disposed between baffles 29—31 and adapted to intercept the parallel beams of light which pass through slot 32 and thus form the beams of light such that the line of focus falls in the plane of the film whereupon narrow sharply defined beams of light pass through slots 33—34 and impinge on the film as slits 24—25 align with slot 34 in baffle 28 thereby pre-exposing the film and applying a reference grid pattern having sharply defined lines which will appear thereon when the film is developed.

In view of the foregoing it will be apparent that a new and improved reference grid material and apparatus for making the same has been devised wherein the unexposed film is passed over an internally lighted rotating drum which allows thin beams of light to impinge on the film thereby pre-exposing the film in a definite grid pattern whereupon a reference grid will become visible during developing of the film after the film has been used.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for applying reference grid lines to unexposed photographic film comprising a rotatable drum having a transparent cylindrical wall, an opaque coating having a plurality of transversely and circumferentially disposed slits mounted on the inner surface of said wall, the length of said transverse slits being equal to the width of said wall and said drum, a light source centrally located within said drum, means mounted within said drum for allowing light from said source to impinge against only a portion of said opaque surface, photographic film having an emulsion layer engaging the outer surface of said drum, and means mounted in proximity to said wall for collimating the light rays emanated from said slits whereby grid lines are applied to said photographic film.

2. Apparatus for applying reference grid lines to unexposed photographic film comprising a rotatable drum having a transparent cylindrical wall, a first opaque coating mounted on the inner surface of said wall, a second opaque coating mounted on the outer surface of said wall, each of said coatings having first and second pluralities of disposed slits, said first slits being at right angles to said second slits, the slits of said first coating being aligned with those of said second coating, a light source centrally located within said drum, a shield mounted within said drum to allow light to impinge against only a portion of said first opaque surface, and photographic film engaging the outer surface of said drum, whereby grid lines are applied to said photographic film.

3. The apparatus of claim 2 wherein said first slits are circumferentially disposed on said coatings, said second slits are transversely disposed on said coatings and are of the same length as the width of said coatings.

4. The apparatus of claim 2 wherein said shield comprises a pair of reflective arms, each of which extends from said light source to close proximity of the inner surface of said drum.

5. Apparatus for applying reference grid lines to unexposed photographic film comprising a rotatable drum having a transparent wall, an opaque coating having a plurality of first and second slits disposed on said wall, said first slits being at right angles to said second slits, a light source centrally located within said drum, a tubular element having a baffle at one end thereof and said light source adjacent the other end thereof, said baffle having a third slit and being mounted adjacent the inner surface of said drum, photographic film engaging the outer surface of said drum, a focusing system located within said tubular element to focus the light emitted by said source on the emulsion layer of said film whereby grid lines are applied to said photographic film.

6. The apparatus of claim 5 wherein said first slits are transversely disposed on said coating, said second slits are circumferentially disposed on said coating and are of the same length as the width of said coating.

7. The apparatus of claim 5 wherein said coating is mounted on the inner surface of said wall and said third slit being substantially the same length as the width of said coating.

8. Apparatus for applying reference grid lines to unexposed photographic film comprising a rotatable drum having a transparent cylindrical wall, an opaque coating having a plurality of transversely and circumferentially disposed slits mounted on the inner surface of said wall, photographic film having an emulsion layer engaging the outer surface of said wall, the width of said film being the same as the width of said coating and of the length of said transverse slits, a light source centrally located within said drum, a tubular element having a first baffle located at one end thereof and said light source located at the other end thereof, second and third baffles mounted within said tubular element, each of said baffles being provided with a rectangular slit, said slits being of the same length as the width of said opaque coating and arranged to allow the passage of a narrow beam of light from said light source through said first baffle, said first baffle being mounted against the inner surface of said drum, a collimating lens located between said light source and said second baffle, and a focusing lens located between said second and third baffles whereby sharp grid lines are applied to said photographic film.

9. The apparatus of claim 8 wherein the width of said second slit is greater than the width of said third slit and the width of said third slit is greater than the width of said first slit.

References Cited in the file of this patent

UNITED STATES PATENTS

| | | |
|---|---|---|
| 2,009,572 | Biery | July 30, 1935 |
| 2,760,419 | Gelb | Aug. 28, 1956 |